United States Patent [19]

Nunweiler

[11] Patent Number: 5,139,064
[45] Date of Patent: Aug. 18, 1992

[54] SAW TOOTH

[76] Inventor: M. W. Kenneth Nunweiler, 3020 Westsyde Road, Kamloops, British Columbia, Canada, V2B7G2

[21] Appl. No.: 672,031

[22] Filed: Mar. 19, 1991

[51] Int. Cl.⁵ .......................................... B27B 33/08
[52] U.S. Cl. ................................. 144/337; 83/13; 83/832; 83/851; 83/852; 83/853; 144/34 R; 144/241
[58] Field of Search ............... 83/672, 832, 852, 851, 83/853, 854, 835, 839, 13; 144/34 R, 241, 336, 337

[56] References Cited

U.S. PATENT DOCUMENTS

| 487,921 | 12/1892 | Gollins | 144/241 |
| 4,081,009 | 3/1978 | Curlett | 144/34 R |
| 4,932,447 | 6/1990 | Morin | 144/34 R |

Primary Examiner—Frank T. Yost
Assistant Examiner—Kenneth E. Peterson
Attorney, Agent, or Firm—Michael M. Sakovich

[57] ABSTRACT

A saw tooth, of which a number are removably mounted on a tree-felling saw head, includes a body portion having a lead cutter and a trailing primary cutter separated by a throat. The combined lead cutters function to cut a narrow side wall kerf on each side of a larger principal kerf together with corresponding inside corners of the larger kerf. The remainder of the larger kerf is then cut out by the following primary cutters, forming a square cut end. As the cut progresses, the combined primary cutters separate the longitudinal fibers of the tree at the square cut end without double cutting the fibers, thereby improving cutting efficiency and reducing energy requirements in felling a tree.

13 Claims, 4 Drawing Sheets

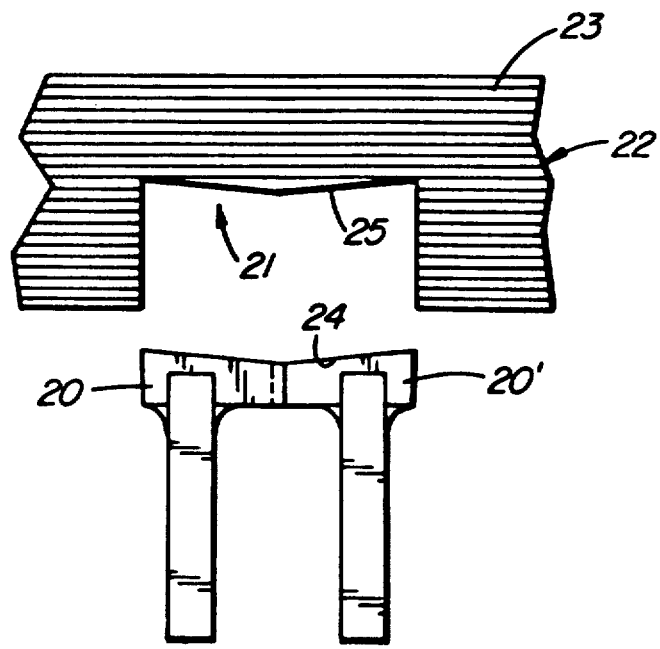
PRIOR ART
FIG. 2B
PRIOR ART
FIG. 2A
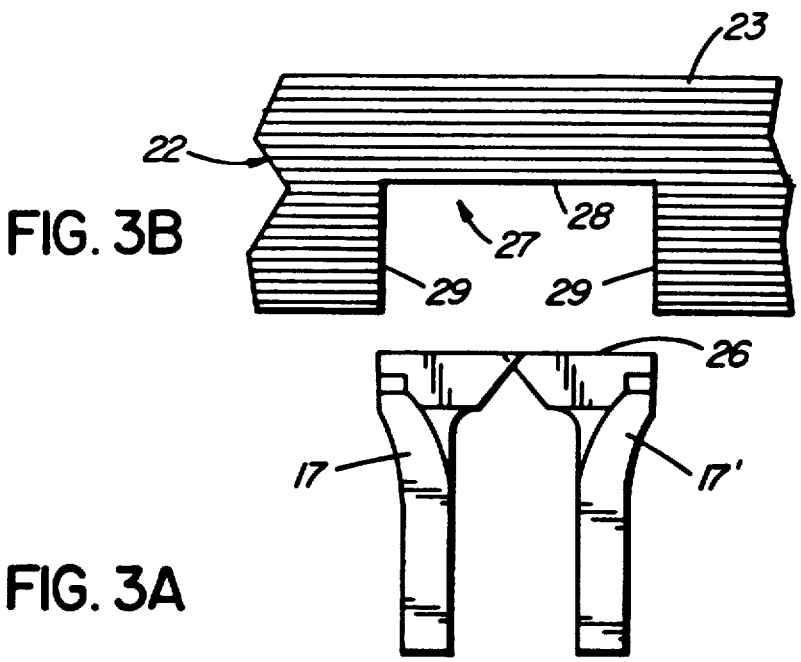
FIG. 3B
FIG. 3A ical working conditions are usually severe, it is par-
SAW TOOTH

FIELD OF THE INVENTION

This invention relates to a saw tooth that is removably attachable to a cutting disk in a tree-felling saw head and more particularly to an improved saw tooth configured to increase cutting efficiency.

BACKGROUND OF THE INVENTION

Tree-felling saw heads are commonly employed in the logging industry and are usually provided with a plurality of saw teeth that are removably mounted for replacement and maintenance purposes. Since environmental working conditions are usually severe, it is particularly important that the saw tooth be robust in structure to minimize machinery downtime and thereby improve operating efficiency. Furthermore, the saw tooth design should be conducive of efficient cutting, even when cutting edges are dulled through use. Improved overall efficiency may thus be attained through the expenditure of less energy per felled tree. This aspect is particularly significant in regions where fuel for tree-felling vehicles entails expensive transportation costs.

Although various types of saw teeth are known and used in the industry, each with an expected claim to improved cutting efficiency, nevertheless problems affecting cutting tooth efficiency persist and optimum goals of efficiency are yet to be realized.

SUMMARY OF THE INVENTION

A principal objective of the invention is an improved saw tooth having increased cutting efficiency with a consequent reduced energy requirement to fell a tree.

A further provision of the invention is an improved saw tooth that permits using a low speed, high torque saw driven by an operating source of low horsepower.

Another provision of the invention is a saw tooth of improved design that is capable of felling a tree in reduced time.

Yet another provision of the invention is an improved saw tooth for a tree-felling saw head that is capable of a longer service period between maintenance intervals.

The present invention substantially ameliorates the problems heretofore described and achieves the aforenoted provisions of the invention. Thus, in a tree-felling saw head that includes a protective stationary top plate having an outwardly facing circumferential edge, a corresponding bottom plate, hub means disposed between the plates and joining same in coaxial spaced relation, a center disk rotatably mounted on the hub means between the plates and adapted to removably mount a plurality of individual ones of saw teeth mounted alongside a peripheral edge of the disk on opposite sides thereof in alternate uniformly spaced relation, a concentric recess in the disk adapted to receive the top plate, and means mounted on the disk within the recess for rotatably driving the disk, the aforenoted provisions may be achieved in one aspect of the invention by recourse to an improvement of a saw tooth comprising a body portion adapted to be fastened alongside the peripheral edge the disk, a lead cutter extending forwardly of the body portion and including a cutting edge adapted to cut a narrow side wall kerf of a larger principal kerf and the corresponding inside corner thereof, a primary cutter trailing the lead cutter for cutting a corresponding remainder of the kerf with a cutting leading edge defined by a spiral around the surface of a cylinder having a radius equal to the radius of a tip of the primary cutter on the saw head disk and a trailing edge stepped radially inwardly from the radius of the tip of the primary cutter to prevent contact with the end wall of the kerf, and a throat portion separating the lead and primary cutters.

In another aspect of the invention the foregoing provisions may be achieved through a method for felling a tree by transversely cutting through a longitudinally fibrous trunk thereof, comprising the steps of cutting a narrow side wall kerf on each side of a larger principal kerf and forming therein corresponding square cut corners, and separating the longitudinal fibers of the tree between the square cut corners to open the principal kerf in increments substantially parallel to the longitudinal fibers.

BRIEF DESCRIPTION OF THE DRAWINGS

The invention will now be more particularly described with reference to embodiments thereof shown, by way of example, in the accompanying drawings wherein:

FIG. 2a is an end view of a pair of prior art saw teeth positioned in a cutting configuration;

FIG. 2b is a cross-sectional view of a kerf cut by the saw teeth of FIG. 2a;

FIG. 3a is an end view of a pair of saw teeth in accordance with the invention positioned in a cutting configuration;

FIG. 3b is a cross-sectional view of a kerf cut by the saw teeth of FIG. 3a;

DESCRIPTION OF THE PREFERRED EMBODIMENTS

Figure 1:
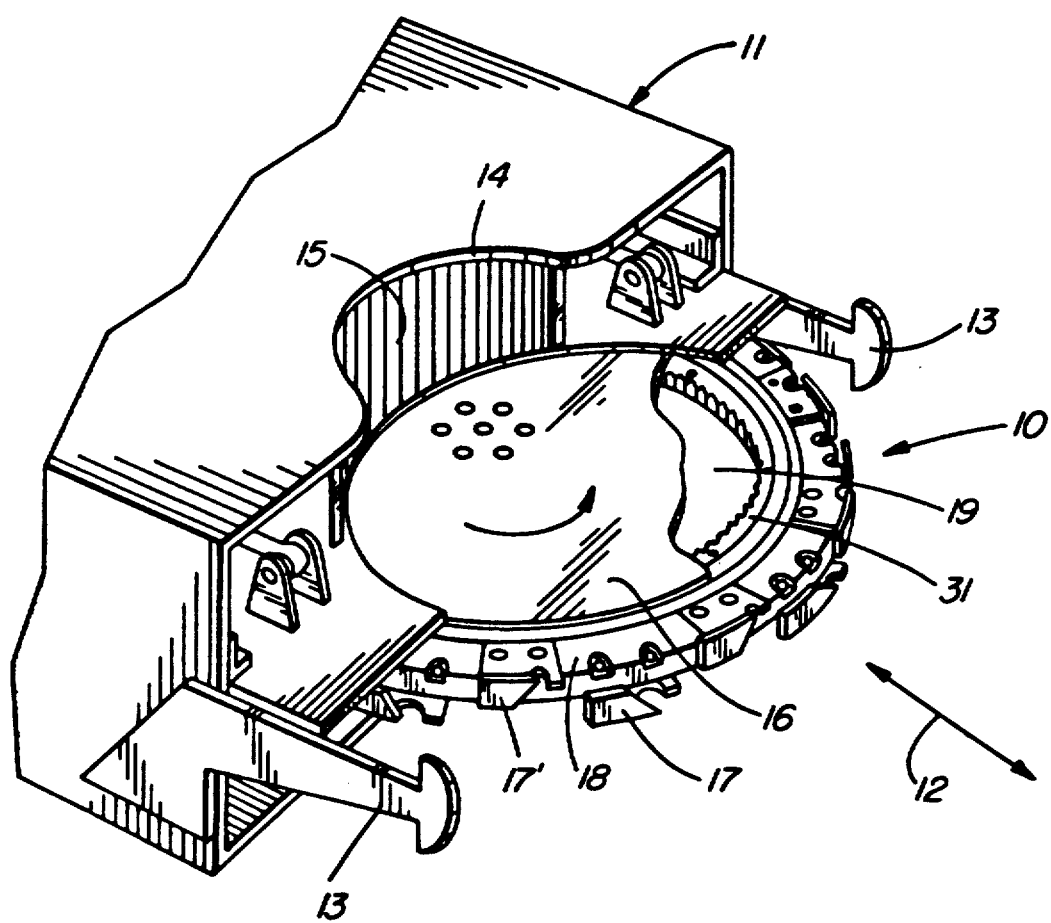
FIG. 1 is a perspective fragmentary view of a tree-felling saw head embodying a plurality of saw teeth in accordance with the invention.

A perspective view of a tree-felling saw head 10 is illustrated in FIG. 1 and shows the saw head 10 operably extended forwardly of a saw head enclosure 11. A more detailed description of the saw head 10 is presented in Canadian patent application No. 574,491, filed Oct. 11, 1988, in the name of M. W. Kenneth Nunweiler. A double-headed arrow 12 indicates the direction along which the saw head is reciprocable. Thus the saw head may be fully extended, as shown, when cutting a tree and then completely retracted for safety when not in use and to prevent damage thereto through inadvertent contact with rocks and the like. In this regard, a bumper 13 extends outwardly from an external surface of each side wall of the enclosure 11 to prevent accidental side contact with the saw head 10 when extended.

Grapple arms (not shown) are usually employed with the saw head 10 to assist in tree cutting. Thus, while a tree trunk is firmly gripped by the grapple arms (not shown) against an upper curvilinear supporting edge 14 of the enclosure 11 and a corresponding lower supporting edge (not shown) the saw head 10 is advanced forwardly in the direction of the arrow 12 to sever the tree. When completely cut through, the tree is further supported laterally by a shield plate 15 that substantially conforms to the curvature of the upper edge 14 as shown in FIG. 1. In addition to such lateral support, the base of the tree is carried upon a top plate 16 which enters the kerf as it is cut by a plurality of saw teeth 17 and 17', individual ones of which are removably mounted on each side of a center disk 19 alongside a peripheral edge 18 thereof.

FIG. 2 illustrates an end view of a pair of known saw teeth 20 and 20' which are positioned in a cutting configuration as when mounted on the center disk 19. Although not illustrated in detail, it will be understood that the teeth 20 and 20' are of the type commonly referred to as chainsaw teeth.

A kerf 21 cut by the teeth 20, 20' is illustrated in FIG. 2b which shows a cross-sectional portion of a tree 22 having longitudinal fibers 23. It will be observed that the saw teeth 20 and 20' each have a sloping cutting edge 24 as shown which results in a correspondingly shaped end wall 25 of the kerf 21.

It has been discovered that cross cutting the fibers 23, as in the manner of the prior art, requires an expenditure of additional energy as compared to effecting the same cut using saw teeth 17, 17' illustrated in FIG. 3. The saw teeth 17, 17' are positioned similarly to the teeth of FIG. 2. However, a significant difference observable in FIG. 3a is that cutting edges 26 of the saw teeth 17, 17' are coplanar. A kerf 27 is therefore cut with a square end wall 28 that is substantially parallel to the fibers 23.

In the example of FIG. 3, it has been determined that 90% of the power available for the cut is used to break the fibers 23 along side walls 29 of the kerf 27. Since the side walls 29 are cut in advance of the remaining portion of the kerf 27 in accordance with the invention, only 10% of the power available is required to remove the remainder of the kerf 27.

The cutting action of the saw teeth 20, 20' cuts or breaks the fibers 23 more than once. This is wasteful of available power which otherwise could be used to increase the speed of the cut. In high production situations, speed is critical to efficiency of performance and therefore there is a perceived need to design improved cutting apparatus for felling trees.

As will be described in greater detail in the description herein to follow, the saw teeth 17, 17' are able to cut the kerf 27 efficiently with a square profile as illustrated in FIG. 3b. As a result, the saw teeth 17, 17' are capable of separating the fibers 23 with relative ease and to achieve thereby the desired result of improved cutting efficiency.

Figure 4:
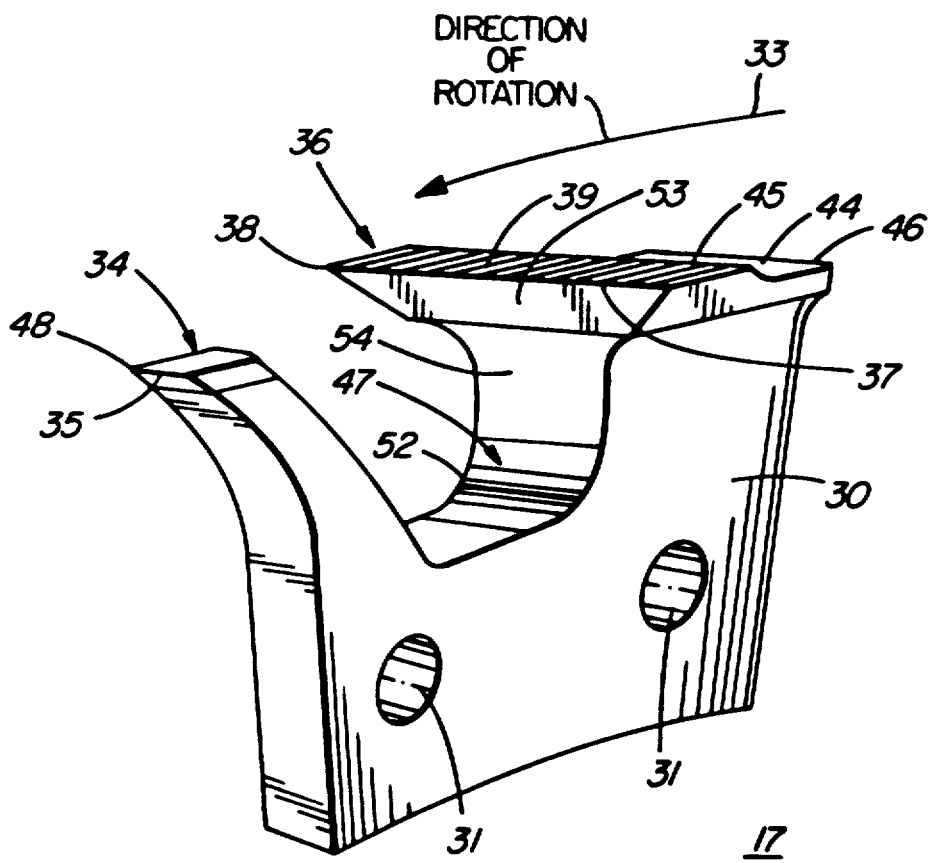
FIG. 4 is a perspective view of a saw tooth in accordance with the invention.

A perspective view of the saw tooth 17 is shown in FIG. 4. In the interest of brevity, the following description will apply principally to the saw tooth 17. It will be understood, however, that the following description may apply equally to the saw tooth 17' since one saw tooth is merely the mirror image of the other. Equal numbers of the saw teeth 17, 17' are fastened to the center disk 19 using conventional fastening means such as threaded machine screws and corresponding threaded apertures in the center disk 19.

Various structural elements of the saw tooth 17 are identified in FIG. 4 where it will be seen that the saw tooth comprises a body portion 30 that is adapted to be fastened alongside the peripheral edge of the center disk 19. Two apertures 31 include a countersunk portion 32 (FIG. 6) that facilitates mounting the saw tooth 17 using flat-head threaded machine screws (not shown).

Rotational direction of the saw tooth 17 is indicated by an arrow 33. A lead cutter 34 extends i forwardly of the portion 30 and includes a cutting edge 35 that is adapted to cut a narrow kerf which defines the side wall 29 of the larger principal kerf 27. In addition, a corresponding square corner between the side wall 29 and the end wall 28 is formed.

A primary cutter 36 trails the cutter 34 and functions to cut a corresponding remainder of the kerf 27 with a cutting leading edge 37 that is defined by a spiral around the surface of a cylinder having a radius equal to the radius of a tip 38 of the cutter 36 when mounted on the center disk 19. Since the edge 37 is at a constant radius to the rotational axis of the center disk 19, the edge 37 does not cross wood fibers when cutting the kerf 27. Instead, the end wall 28 is cut square as previously described in FIG. 3.

Trailing the edge 37 there is a ruled, radially extending outermost surface 39 that is defined by two spirals around two cylinders (not shown) of slightly different radii. As may be best seen in FIG. 6, a trailing portion of the surface 39 terminates along a trailing edge 45 and is lowered 8.0° (FIG. 5) to provide the cutting action required with clearance. If a line is drawn from the edge 37 to the edge 45, it is a straight line. A series of such straight lines following the arc indicated by the arrow 33, provides the required curvature to cut between the fibers 23 and to separate the same without double cutting and using extra power unnecessarily.

Figures 5, 7:
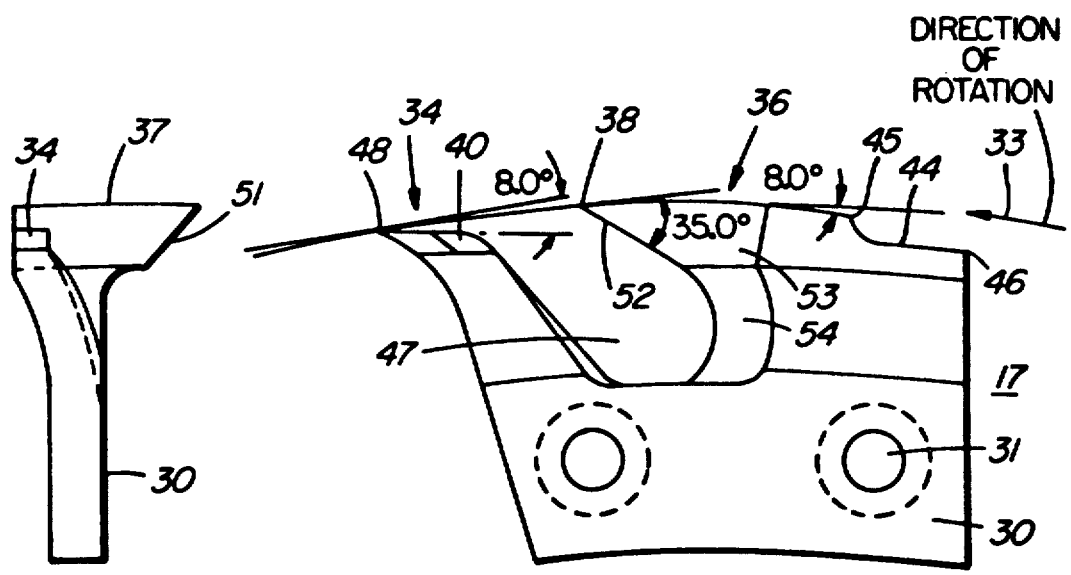
FIG. 5 is a side elevation view of the saw tooth of FIG. 4.
FIG. 7 is an end view of the saw tooth of FIG. 5.

FIG. 5 shows a second trailing edge 46, and a surface portion 44, that are stepped radially inwardly from the radius of the tip 38 to prevent any frictional contact with the wall 28 so as to further improve cutting efficiency. A throat portion 47 separates the cutters 34 and 36 and facilitates removal of wood chips from the kerf 27.

The edge 35 of the cutter 34 breaks the fibers 23 in the corner of the kerf 27 by means of a sharpened tip 48. Cutting the narrow side wall kerf and fracturing the fibers in the corner requires about 90% of the available power to drive the saw head 10. This equates to a power consumption of about 45% for each cutter 34 on a pair of saw teeth 17, 17' needed to form the kerf 27.

In the event that the cutter 34 is dulled by the action of rocks and other debris at the base of the tree 22, the cutter 34 will continue to fracture the fibers 23 via compression in the corner of the kerf. It has been found that the fibers 23 damaged in this manner release readily when the cutter 36 advances into the fibers to form the kerf 27.

As well as achieving improved efficiency, the cutter 34 functions to protect the tip 38 of the cutter 36 in order to clear a path for the latter. This feature is achieved by setting the cutter 34 into the path of the arc traced by the cutter 36 in order to clear a path for the latter.

Figure 6:
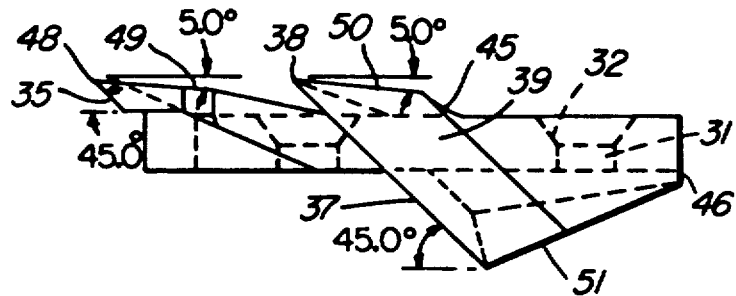
FIG. 6 is a top plan view of the saw tooth of FIG. 5.

Reference to FIGS. 5 and 6 shows that the cutting edges 35 and 37 of cutters 34 and 36, respectively, are positioned at an angle of 45° relative the cutting direction of the cutters. As previously described, the cutter 34 breaks the fibers 23 and initiates cutting the kerf 27. The following cutter 36 subsequently separates the wood fibers without double cuttingi the same.

Each saw tooth 17, 17' takes an incremental bite of from 0.100 inches to 0.200 inches on each cut path. As a result, a tree 22 that is from 20–22 inches in diameter will be cut in approximately 4 seconds. Since the center disk 19 is advanced forwardly at a rate of approximately 5.25 inches per second using hydraulic feed cylinders as described in copending application Ser. No. 574,491, and the rim speed of the disk is in the range of from 300 to 400 rpm using 20 saw teeth 17, 17', the aforedescribed cutting results are readily achieved.

FIGS. 5 and 6 also illustrate the cutters 34 and 36 with side walls 49 and 50, respectively, each of which is directed inwardly of the center disk 19 at an angle of 5.0° relative to the cutting direction of the cutters. It will be understood therefrom that an opposite side wall 51, corresponding to the side wall 50, is angled convergingly towards the center disk 19.

Turning to FIG. 5, it will be observed that a top surface 40 of the cutter 34 trailing the cutting edge 35 is declined radially inwardly from the tip 48 at an angle of 8.0° relative a line tangent to the cutting circle of the cutters 34 and 36. The aforedescribed bite is a function of this declination.

The tip 38 may be regarded as a point of origin for the edge 37 as well as a cutting leading edge 52 of the side wall 50. The edge 52 is downwardly directed into the throat 47 at an angle of 35.0° relative a line tangent to the cutting circle of the cutters as shown. A cutting surface of the cutter 36 intermediate the edges 37 and 52 comprises separate cutting surfaces 53 and 54 that comprise respective ruled surfaces defined by two spirals around two cylinders of different radii.

To those individuals skilled in the art to whom this specification is addressed, it will be apparent that the embodiment heretofore described may be varied to meet particular requirements without departing from the true spirit and scope of the invention disclosed. For example, the various surface angles disclosed may be varied somewhat to meet particular operating criteria. The foregoing embodiment is therefore not to be taken as indicative of the limits of the invention but rather as an exemplary structure of the invention which is described by the claims appended hereto.

The embodiments of the invention in which an exclusive property or privelege is claimed are defined as follows:

1. In a saw head that includes a protective stationary top plate having an outwardly facing circumferential edge, a corresponding bottom plate, hub means disposed between the plates and joining same in coaxial spaced relation, a center disk rotatably mounted on the hub means between the plates and adapted to removably mount a plurality of individual ones of saw teeth mounted alongside a peripheral edge of the disk on opposite sides thereof in alternate uniformly spaced relation, a concentric recess in the disk adapted to receive the top plate, and means mounted on the disk within the recess for rotatably driving the disk, the improvement of a saw tooth comprising a body portion adapted to be fastened alongside the peripheral edge of the disk, a lead cutter extending forwardly of the body portion and including a cutting edge adapted to cut a narrow side wall kerf of a larger principal kerf and a corresponding inside corner thereof, a primary cutter trailing the lead cutter for cutting a corresponding remainder of the kerf with a cutting leading edge defined by a spiral around a surface of a cylinder having a radius substantially equal to the radial distance from a tip of the primary cutter on the saw head disk to the rotational axis of the disk and a trailing edge stepped radially inwardly from the radius of the tip of the primary cutter to prevent contact with an end wall of the principal kerf, and a throat portion separating the lead and primary cutters.

2. A saw tooth as claimed in claim 1, wherein the leading edge of the primary cutter is adapted to cut the end wall portion of the principal kerf orthogonally to the saw head disk thereby forming a kerf with a flat profile.

3. A saw tooth as claimed in claim 2, wherein the primary cutter includes a ruled, radially extending outermost surface defined by two spirals around two cylinders of slightly different radii.

4. A saw tooth as claimed in claim 3, wherein the leading edge of the primary cutter is at a constant radius to the rotational axis of the saw head disk so that the leading edge does not cross wood fibers in a felled tree.

5. A saw tooth as claimed in claim 4, wherein the cutting edges of both the lead cutter and the primary cutter are positioned at an angle of 45° relative to a cutting direction of the cutters.

6. A saw tooth as claimed in claim 5, wherein the lead cutter includes a tip and a side wall of respective ones of the lead and primary cutters trailing a corresponding tip is directed inwardly of the saw head disk at an angle of 5.0° relative the cutting direction of the cutters.

7. A saw tooth as claimed in claim 6, wherein a top surface of the lead cutter trailing the cutting edge thereof is declined radially inwardly from the tip at an angle of 8.0° relative a line tangent to a cutting circle of the cutters.

8. A saw tooth as claimed in claim 7, wherein a portion of a top surface of the primary cutter intermediate the cutting edge and the stepped trailing edge is declined radially inwardly from the tip at an angle of 8.0° relative a line tangent to the cutting circle of the cutters.

9. A saw tooth as claimed in claim 8, wherein the tip of the primary cutter includes a cutting leading edge of the side wall thereof that is downwardly directed into the throat at an angle of 35.0° relative a line tangent to the cutting circle of the cutters.

10. A saw tooth as claimed in claim 9, wherein a surface of the primary cutter intermediate the cutting edges thereof and the throat comprises a ruled curvilinear surface defined by two spirals around two cylinders of different radii.

11. A saw tooth as claimed in claim 10, wherein the tip side wall and a side wall opposite thereto of the primary cutter are angled convergingly in a direction trailing the cutting edges.

12. A saw tooth adapted to be removably mounted on opposite sides, in alternate uniformly spaced relation, of a peripheral edge of a saw disk, comprising:

a body portion adapted to be fastened alongside the peripheral edge of the disk;

a lead cutter extending forwardly of the body portion and including a cutting edge adapted to cut a narrow side wall kerf of a principal kerf and a corresponding inside corner thereof;

a primary cutter trailing the lead cutter for cutting a corresponding remainder of the kerf with a cutting leading edge defined by a spiral around a surface of a cylinder having a radius substantially equal to the radial distance from a tip of the primary cutter on the saw head disk to the rotational axis of the disk and a trailing edge stepped radially inwardly from the radius of the tip of the primary cutter to prevent contact with an end wall of the principal kerf; and a throat portion separating the lead and primary cutters.

13. A method for felling a tree by transversely cutting through a longitudinally fibrous trunk thereof, comprising the iterative steps of:
   cutting a first narrow side wall kerf that defines a first side wall of a larger principal kerf and forming therein a corresponding first square cut inside corner;
   separating the longitudinal fibers of the tree adjacent the first square cut corner to open a first portion of the principal kerf in increments substantially parallel to the longitudinal fibers;
   cutting a second narrow side wall kerf that defines a second side wall of the larger principal kerf and forming therein a corresponding second square cut inside corner; and
   separating the longitudinal fibers of the tree adjacent the second square cut corner to open the remainder of the principal kerf in increments substantially parallel to the longitudinal fibers.

* * * * *